United States Patent
Yamano

(10) Patent No.: US 8,726,094 B2
(45) Date of Patent: May 13, 2014

(54) COMMUNICATION MONITORING APPARATUS, COMMUNICATION MONITORING METHOD, AND STORAGE MEDIUM STORING COMMUNICATION MONITORING PROGRAM

(75) Inventor: Hiroshi Yamano, Kawasaki (JP)

(73) Assignee: Canon Kabushiki Kaisha (JP)

(*) Notice: Subject to any disclaimer, the term of this patent is extended or adjusted under 35 U.S.C. 154(b) by 249 days.

(21) Appl. No.: 13/180,698

(22) Filed: Jul. 12, 2011

(65) Prior Publication Data

US 2012/0017126 A1 Jan. 19, 2012

(30) Foreign Application Priority Data

Jul. 15, 2010 (JP) ................... 2010-160630

(51) Int. Cl.
*G06F 11/00* (2006.01)
(52) U.S. Cl.
USPC .............................. 714/43; 714/47.1; 714/44
(58) Field of Classification Search
USPC .................. 714/43, 44, 47.1, 55, 56
See application file for complete search history.

(56) References Cited

U.S. PATENT DOCUMENTS

| | | | | |
|---|---|---|---|---|
| 6,032,271 | A * | 2/2000 | Goodrum et al. | 714/56 |
| 6,738,834 | B1 * | 5/2004 | Williams et al. | 710/8 |
| 7,178,070 | B2 * | 2/2007 | Pihet et al. | 714/55 |
| 7,406,545 | B1 * | 7/2008 | Rothberg et al. | 710/15 |
| 8,042,009 | B2 * | 10/2011 | Takaishi et al. | 714/55 |
| 8,375,258 | B1 * | 2/2013 | Sheets et al. | 714/55 |
| 8,510,606 | B2 * | 8/2013 | Wight et al. | 714/43 |
| 2007/0028148 | A1 * | 2/2007 | Kulidjian et al. | 714/47 |
| 2008/0052543 | A1 * | 2/2008 | Sokorac | 713/300 |
| 2010/0287422 | A1 * | 11/2010 | Miyazaki | 714/55 |
| 2010/0332902 | A1 * | 12/2010 | Banginwar et al. | 714/23 |
| 2011/0273998 | A1 * | 11/2011 | Mudrick et al. | 370/252 |

FOREIGN PATENT DOCUMENTS

JP 2001-154763 A 6/2001

* cited by examiner

*Primary Examiner* — Marc Duncan
(74) *Attorney, Agent, or Firm* — Rossi, Kimms & McDowell LLP

(57) ABSTRACT

A communication monitoring apparatus that is capable of preventing determination of communication error due to communication shutdown accompanying the communication speed change so as not to inspire a user with unnecessary uneasiness. The communication monitoring apparatus monitors a connecting condition of communication between a terminal that can change a communication speed and a host apparatus through a network. A check unit periodically checks whether the connecting condition of communication between the terminal and the host apparatus through the network is normal or abnormal at first set time, and determines that a communication error occurs when the checked result shows abnormal connecting condition. A control unit detects a communication speed change in the terminal, and stops the check by the check unit before the communication speed change concerned.

14 Claims, 8 Drawing Sheets

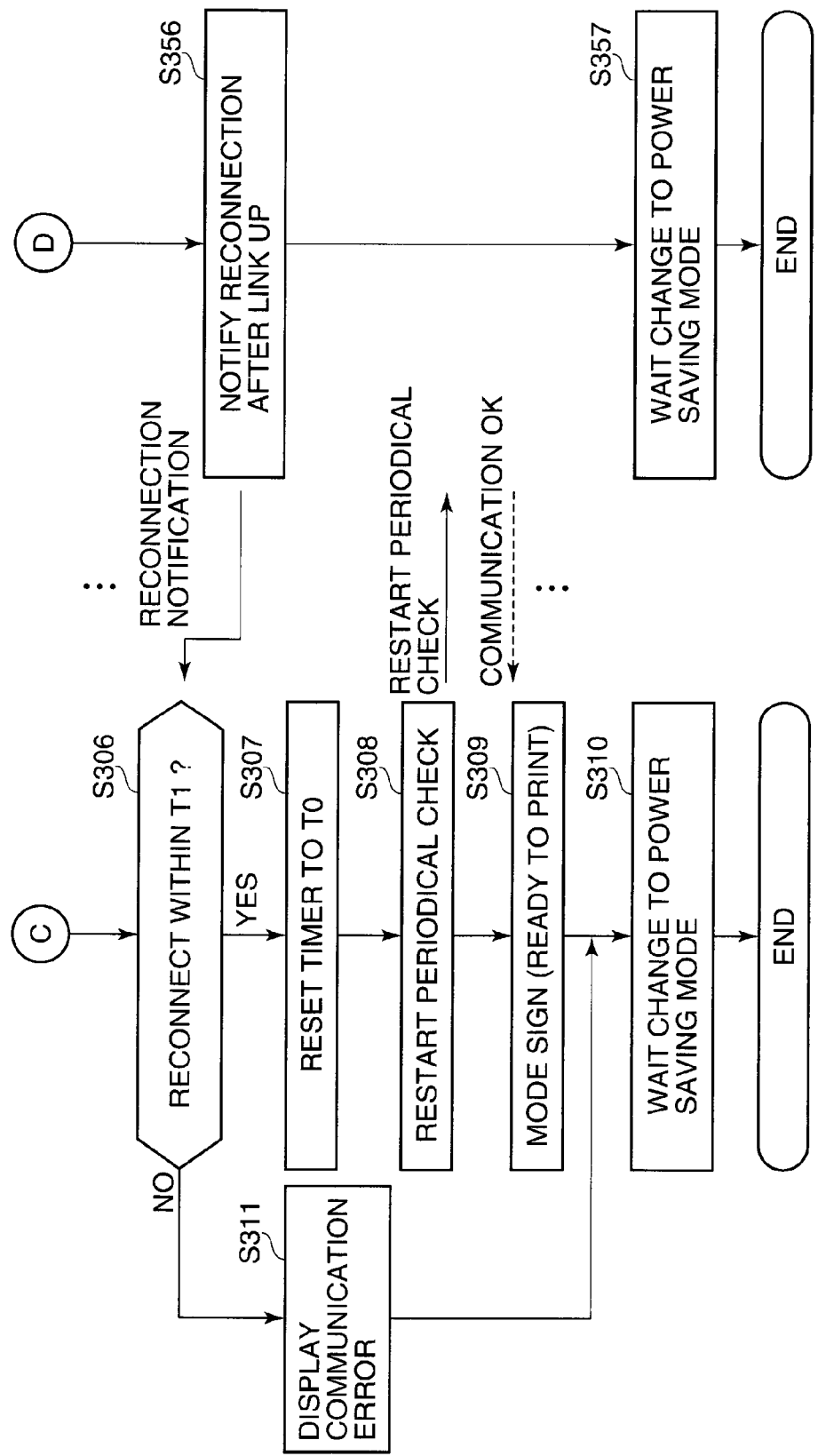

COMMUNICATION MONITORING APPARATUS, COMMUNICATION MONITORING METHOD, AND STORAGE MEDIUM STORING COMMUNICATION MONITORING PROGRAM

BACKGROUND OF THE INVENTION

1. Field of the Invention

The present invention relates to a technique for monitoring a connecting condition of communication between a terminal that can change a communication speed and a host apparatus through a network.

2. Description of the Related Art

Conventionally, there is a known communication system in which a terminal like a printer that can change a communication speed is connected to a host apparatus like a host computer (PC) through a network. For example, Japanese Laid-Open Patent Publication (Kokai) No. 2001-154763 (JP 2001-154763A) discloses a communication system in which a printer is connected to a host PC via a wire LAN. The host PC that has a function of a communication monitoring apparatus monitors a connecting condition of the communication with the printer. In the communication system, the printer lowers the communication speed of the wire LAN so as to reduce power consumption of the entire printer when entering in a power saving mode.

However, the communication system of the above-mentioned publication shuts down a high-speed connection (link) with the host PC once and starts a low-speed connection when changing the communication speed of the wire LAN. In this case, although the shutdown time is a second order, an application, which can display status of the printer, of the host PC performs periodical checks with a time interval of a microsecond order. Therefore, whenever the communication speed is changed, the application determines that a communication error occurs as a result of the periodical check, and a status message of "communication error" is displayed. This is a problem.

Temporary communication shutdown accompanying the communication speed change is assumed to be recovered soon and is not a serious situation. However, a user cannot grasp the situation, which inspires the user with unnecessary uneasiness, increasing queries to a call center.

SUMMARY OF THE INVENTION

The present invention provides a communication monitoring apparatus that is capable of preventing determination of communication error due to communication shutdown accompanying the communication speed change so as not to inspire a user with unnecessary uneasiness.

Accordingly, a first aspect of the present invention provides a communication monitoring apparatus that monitors a connecting condition of communication between a terminal that can change a communication speed and a host apparatus through a network, comprising a check unit configured to periodically check whether the connecting condition of communication between the terminal and the host apparatus through the network is normal or abnormal at first set time, and to determine that a communication error occurs when the checked result shows abnormal connecting condition, and a control unit configured to detect a communication speed change in the terminal, and to stop the check by the check unit before the communication speed change concerned.

Accordingly, a second aspect of the present invention provides a communication monitoring method in a communication monitoring apparatus that monitors a connecting condition of communication between a terminal that can change a communication speed and a host apparatus through a network, the method comprising a checking step of periodically checking whether the connecting condition of communication between the terminal and the host apparatus through the network is normal or abnormal at first set time, and to determine that a communication error occurs when the checked result shows abnormal connecting condition, a stopping step of detecting a communication speed change in the terminal, and of stopping the check by the checking step before the communication speed change concerned, a first determination step of determining whether the communication of the terminal is reconnected after disconnecting once due to a communication speed change within second set time that is longer than the first set time after the stop by the stopping step, a restarting step of restarting the periodical check in the check step when it is determined to be reconnected within the second set time in the first determination step, and a second determination step of determining that a communication error occurs when it is determined not to be reconnected within the second set time in the first determination step.

Accordingly, a third aspect of the present invention provides a non-transitory computer-readable storage medium storing a control program causing a computer to execute the communication monitoring method according to the second aspect.

The present invention is capable of preventing determination of communication error due to communication shutdown accompanying the communication speed change so as not to inspire a user with unnecessary uneasiness.

Further features of the present invention will become apparent from the following description of exemplary embodiments with reference to the attached drawings.

BRIEF DESCRIPTION OF THE DRAWINGS

FIG. 5A and FIG. 5B are flowcharts showing communication processes executed by the host PC and the printer in FIG. 1, respectively, in the case of returning to the printing standby mode from the printing standby mode.

DESCRIPTION OF THE EMBODIMENTS

Hereafter, embodiments according to the present invention will be described in detail with reference to the drawings.

Figure 1:
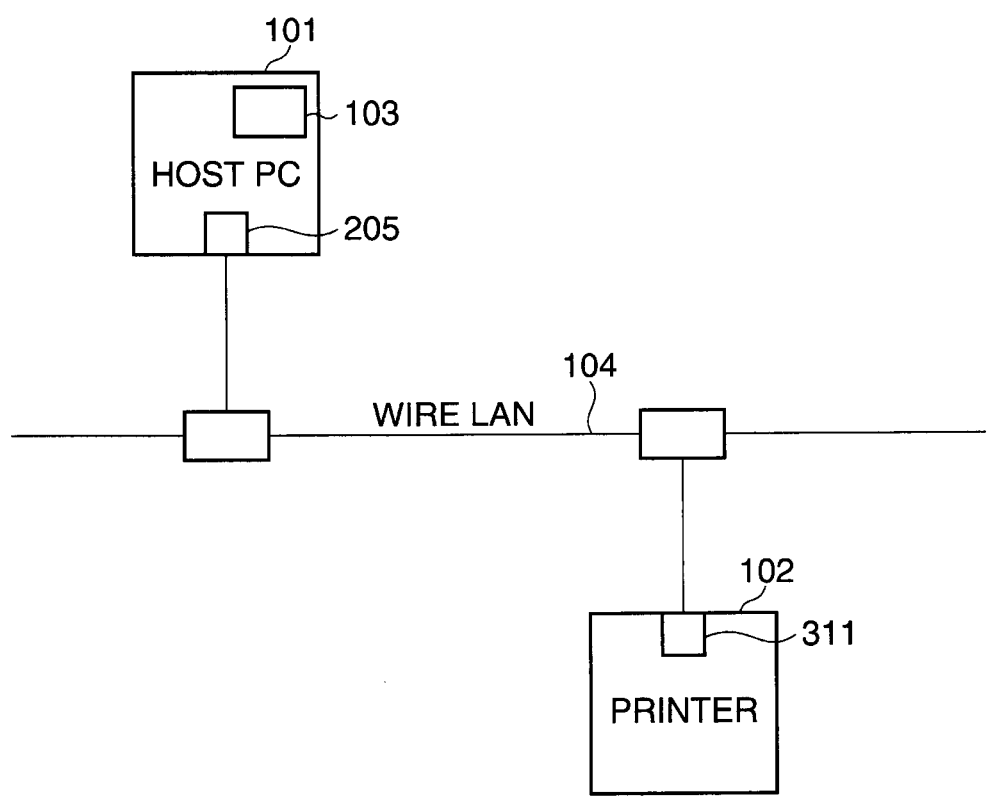
FIG. 1 is a block diagram showing the entire configuration of a communication system in which a host apparatus (a host PC) that has a function of a communication monitoring apparatus according to an embodiment of the present invention connects to a terminal (a printer) via a network.

FIG. 1 is a block diagram showing the entire configuration of a communication system in which a host apparatus that has a function of a communication monitoring apparatus according to an embodiment of the present invention connects to a terminal a via a network.

In this embodiment, a host computer (referred to as a "host PC" hereafter) 101 and a printer 102 are used as examples of the host apparatus and the terminal, respectively. A wire LAN (Local Area Network) 104 is used as the network. The host PC 101 connects to the printer 102 via the wire LAN 104 so that communications are available, which constitutes the communication system. The communication system of the embodiment is a printing system.

A status display window 103, which is software for monitoring conditions including a communication condition of the printer 102, is installed on the host PC 101. The host PC 101 has an external I/F (interface) 205 for connecting to the wire LAN 104. The printer 102 has a LAN-I/F 311 for connecting to the wire LAN 104.

A user issues print instructions by operating an application for editing images and texts on the host PC 101. The host PC 101 applies an image process to image files and text files, and applies a compression process to the files as printing data. The printer 102 can change speed of communication through the wire LAN 104 between high speed and low speed. For example, the low speed is 10 Mbps, and the high speed is 100 Mbps. However the communication speed is not limited to these speeds. A plurality of printers 102 are connectable to the wire LAN 104. The host PC 101 can monitor the condition of the printers.

Figure 2:
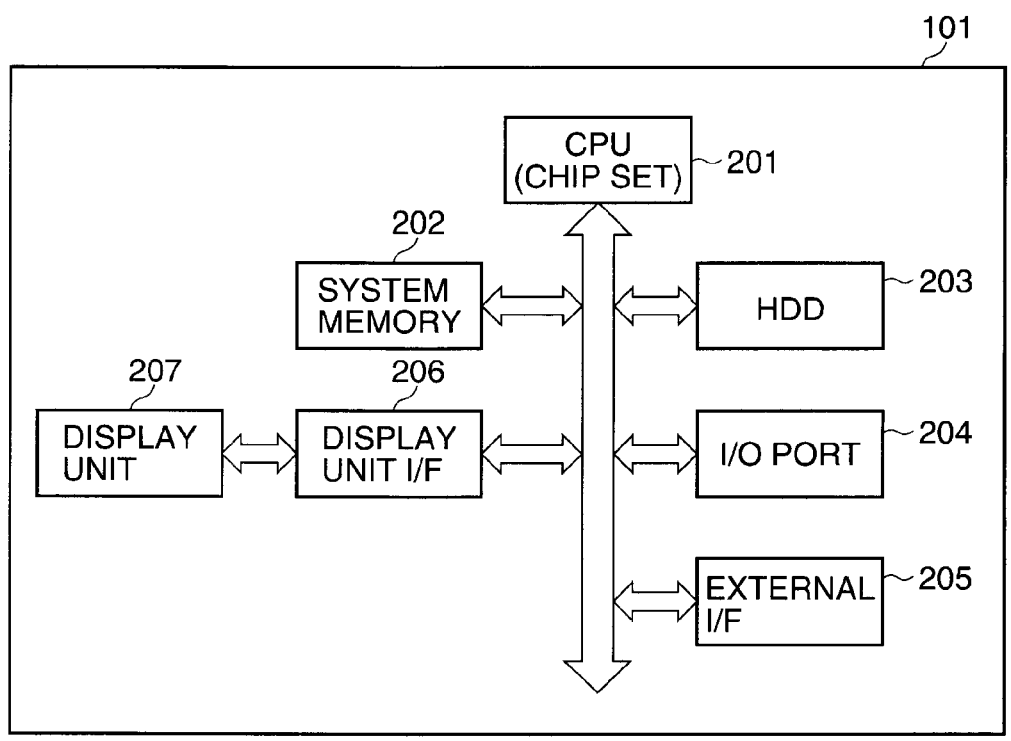
FIG. 2 is a block diagram showing an internal configuration of the host PC shown in FIG. 1.

FIG. 2 is a block diagram showing an internal configuration of the host PC 101.

In the host PC 101, a system memory 202, an HDD (a hard disk drive) 203, an I/O port 204, and a display unit I/F 206 are connected to a CPU 201 via a bus in addition to the above-mentioned external I/F 205. The CPU 201 controls the entire host PC 101 according to an OS (operating system) and programs. The OS and the programs are stored in the HDD 203, and are loaded onto the system memory 202 at the time of execution. The status display window 103 (see FIG. 1) is also similar.

The status display window 103 is the software that is installed on the host PC 101 for monitoring the conditions of the printer 102 through the wire LAN 104 and for displaying the conditions. In fact, the function of the status display window 103 is achieved by collaboration between the hardware like the CPU 201 and the program/data stored in the HDD 203 and the system memory 202, in the host PC 101.

A mouse and a keyboard (not shown) are connected to the I/O port 204. The external I/F 205 is an I/F for connecting to the wire LAN 104 or an I/F like a USB (Universal Serial Bus) for communicating with an external device. In this embodiment, the external I/F 205 is connected to the wire LAN 104. The display unit I/F 206 is connected to the display unit 207 to display a variety of information on the display unit 207. For example, mode signs (FIGS. 6A, 6B, and 6C) by the status display window 103 mentioned later are displayed on the display unit 207. Therefore, a user can check the current condition of the printer 102 monitored by the status display window 103 on the display unit 207.

Figure 3:
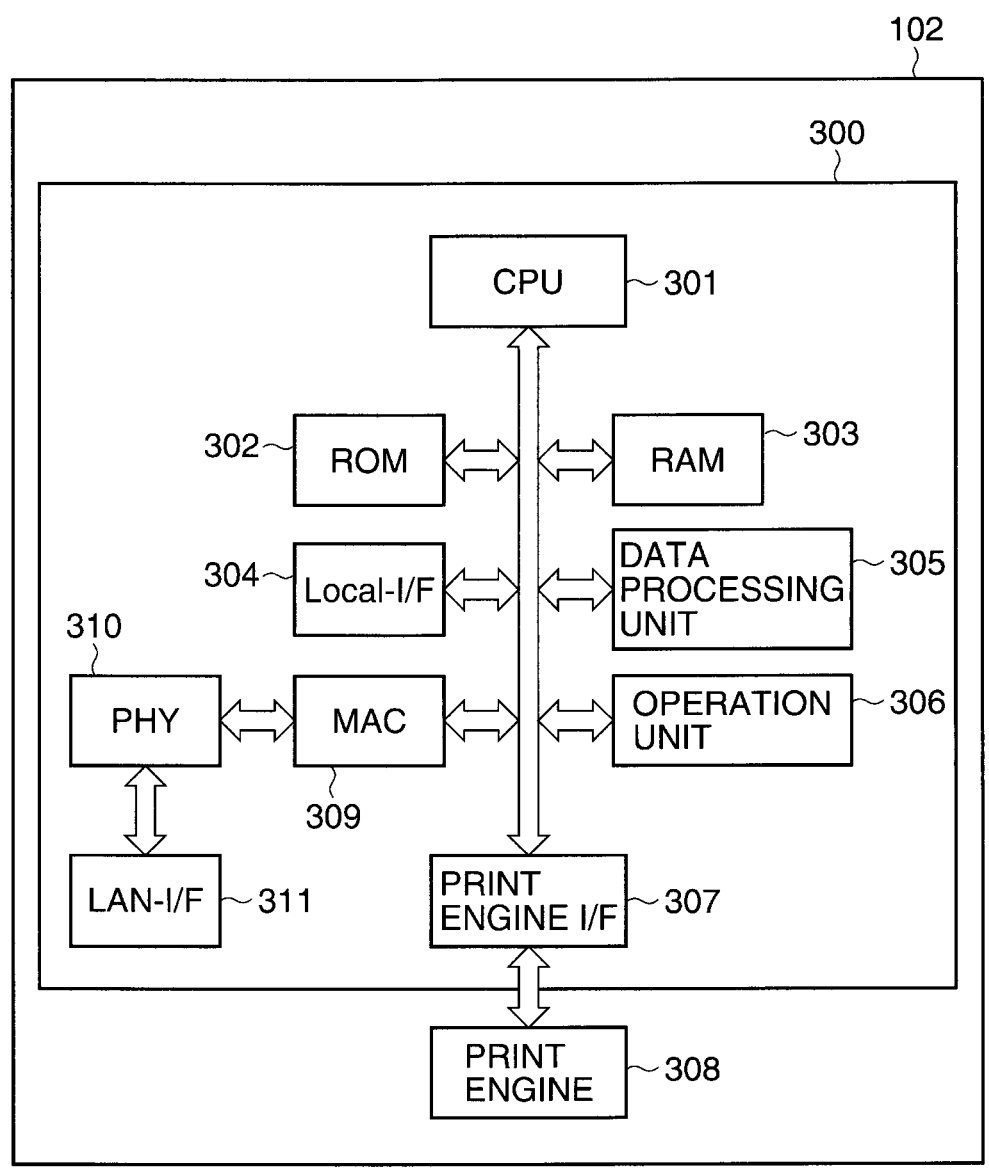
FIG. 3 is a block diagram showing an internal configuration of the printer shown in FIG. 1.

FIG. 3 is a block diagram showing an internal configuration of the printer 102.

The printer 102 mainly expands the printing data to which the host PC 101 applies the compression process, and prints on a sheet. The printer 102 has a power saving mode and a printing standby mode as operation modes.

The printer 102 comprises a printer controller 300 and a print engine 308. In the printer controller 300, a ROM 302, a RAM 303, a Local-I/F 304, a data processing unit 305, and an operation unit 306 are connected to a CPU 301 via a bus. Furthermore, a print engine I/F 307 and a MAC (Media Access Control) 309 are connected to the CPU 301 via the bus. A LAN-I/F 311 is connected to the MAC 309 via a PHY (Physical Layer) chip 310.

The printer controller 300 receives the information about the condition of the print engine 308 via the print engine I/F 307, and transmits printing data received from the Local-I/F 304 or the LAN-I/F 311 to the print engine 308. The CPU 301 controls the entire printer controller 300. The control program is stored in the ROM 302. The program is loaded to the RAM 303 from the ROM 302 and is executed at the time of starting the printer 102.

The printing data received from the Local-I/F 304 or the LAN-I/F 311 is the compressed data, and is expanded by the data processing unit 305, and it is transmitted to the print engine 308. The operation unit 306 is equipped with an LED that displays the condition of the printer 102, a switch to cancel a print operation, etc. (not shown), and is operated by a user.

An external I/F for connecting the printer 102 to the host PC 101 is the Local-I/F 304 or the LAN-I/F 311. The Local-I/F 304 can be directly connected to the host PC 101, for example, it is a USB. The LAN-I/F 311 is used as an interface for connecting the printer 102 to the wire LAN 104 via the MAC 309 and the PHY chip 310.

Figure 4A:
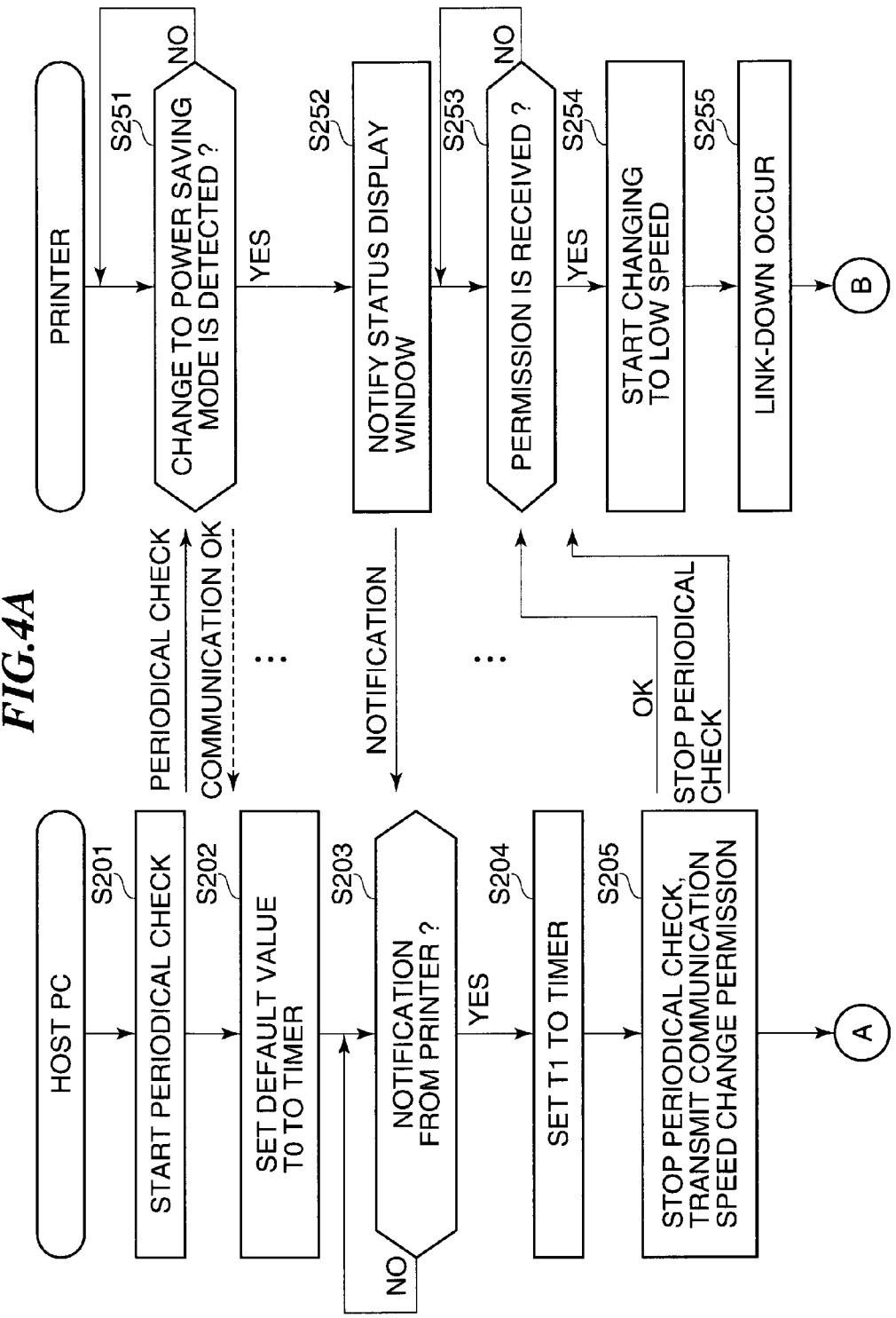
FIG. 4A and FIG. 4B are flowcharts showing communication processes executed by the host PC and the printer in FIG. 1, respectively, in the case of shifting to a power saving mode from a printing standby mode.
Figure 4B:
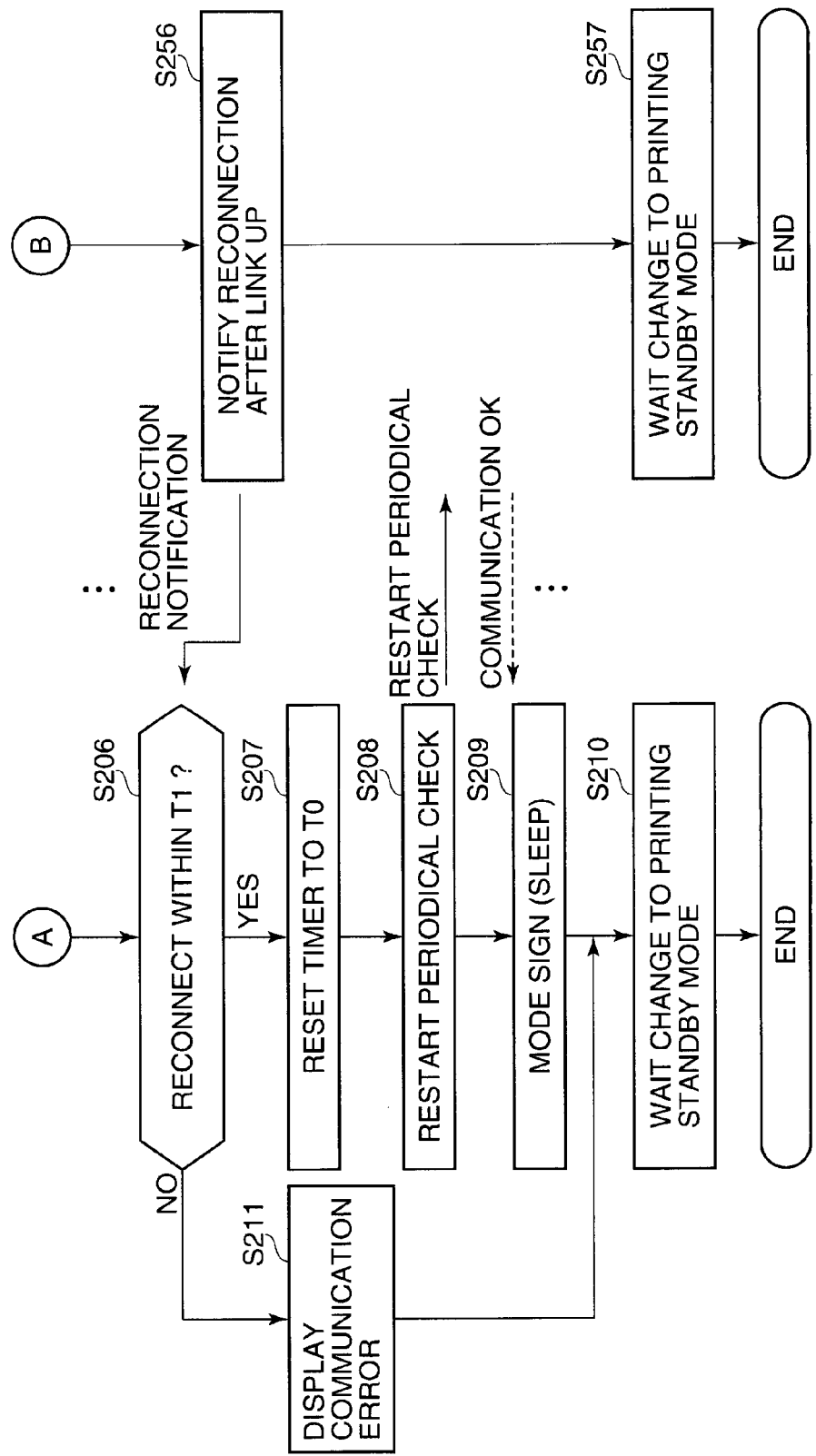
Figure 5A:
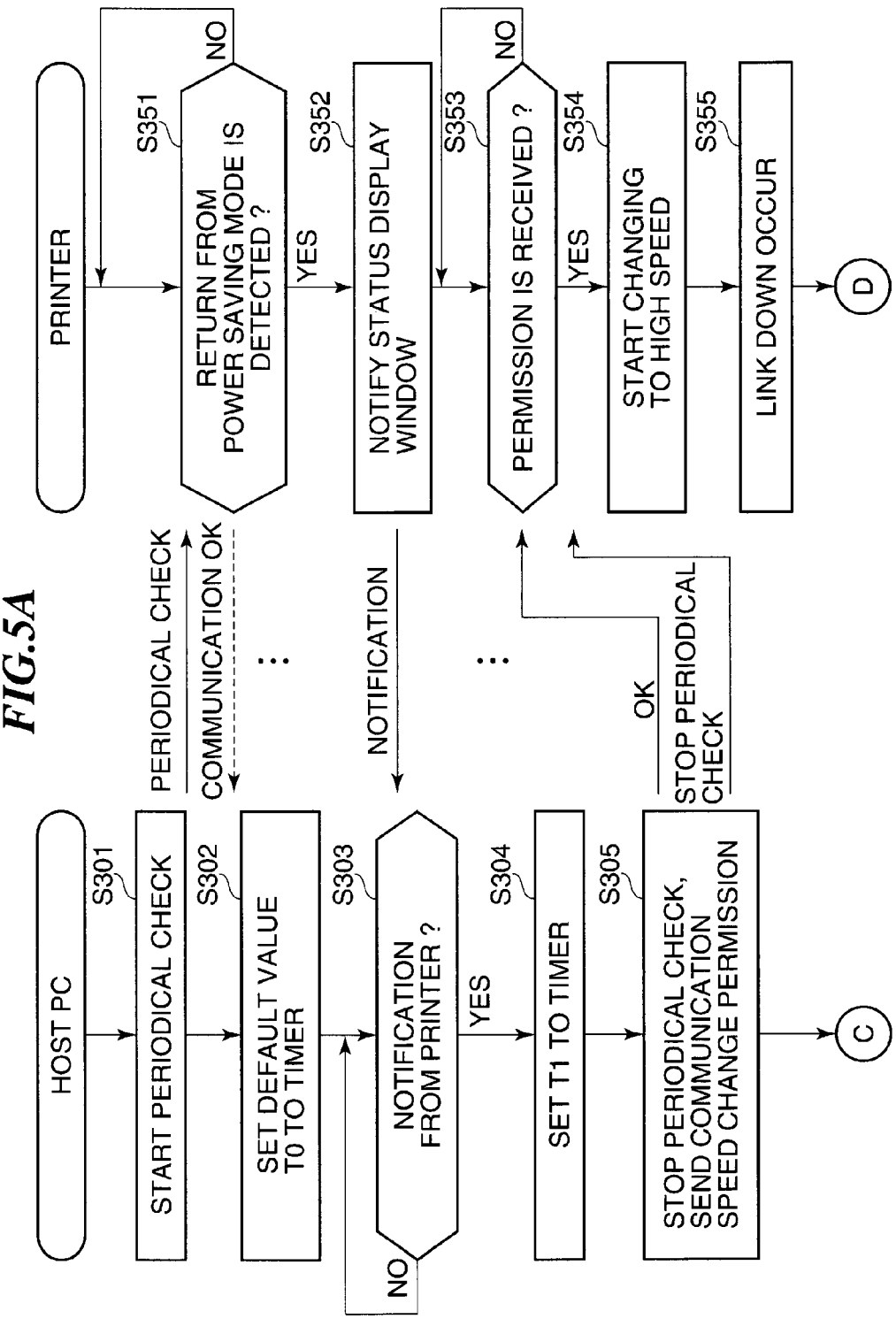
Figure 6A:
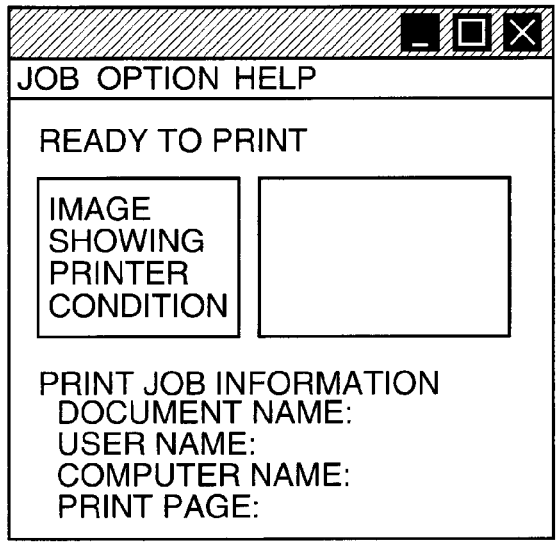
FIGS. 6A, 6B, and 6C are views showing examples of mode signs indicated on a display unit by a status display window (software).
Figure 6B:
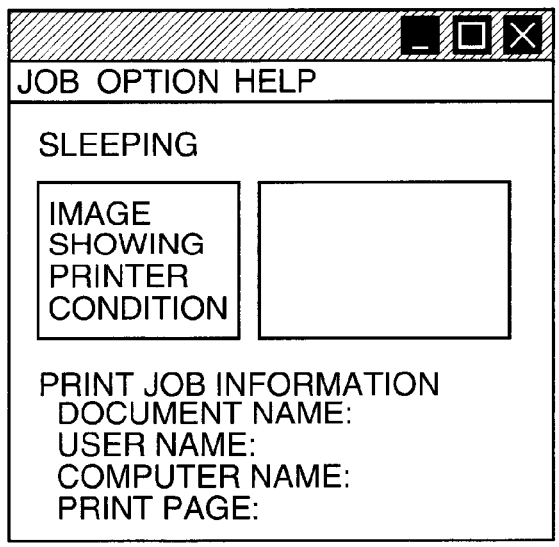
Figure 6C:
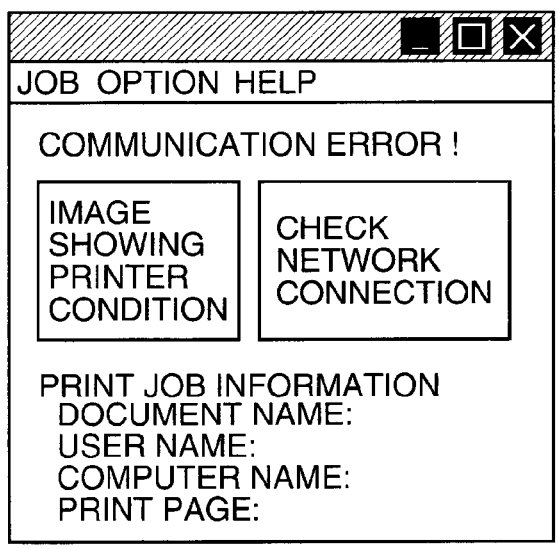

FIG. 4A and FIG. 4B are flowcharts showing communication processes executed by the host PC 101 and the printer 102, respectively, in the case of shifting to a power saving mode from a printing standby mode. FIG. 5A and FIG. 5B are flowcharts showing communication processes executed by the host PC 101 and the printer 102, respectively, in the case of returning to the printing standby mode from the printing standby mode. FIGS. 6A, 6B, and 6C are views showing examples of mode signs indicated on the display unit 207 by the status display window 103.

The processes in FIG. 4A and FIG. 4B or the processes in FIG. 5A and FIG. 5B will be executed according to the mode change. That is, the processes in FIG. 4A and FIG. 4B start just after turning on power to the printer 102. After the processes in FIG. 4A and FIG. 4B are completed, the processes in FIG. 5A and FIG. 5B start, and after the processes in FIG. 5A and FIG. 5B are completed, the processes in FIG. 4A and FIG. 4B start again.

First, the processes in FIG. 4A and FIG. 4B will be described. In the host PC 101, the status display window 103 starts the "periodical check" that periodically checks the connecting condition of the communication with the printer 102 through the wire LAN 104 (step S201). In this periodical check, the status display window 103 sets time T0 (a default value) to a timer value (step S202). The CPU 201 is provided with a timer that clocks time, and the timer value is stored in the system memory 202. The timer clocks the time interval determined by the set timer value whenever executing the periodical check.

When the printer 102 responds to the query of the periodical check by returning a "communication OK", which shows the connecting condition is normal, within the time T0, the status display window 103 determines that the connecting condition is normal, and displays a message of "ready to print" on the display unit 207 (see FIG. 6A). On the other hand, when there is no response of "communication OK", the status display window 103 determines that a communication error occurred, and displays a message of "communication error" on the display unit 207 (see FIG. 6C).

On the other hand, the CPU 301 of the printer 102 determines whether a change to the power saving mode from the printing standby mode is detected (step S251). When the change to the power saving mode is detected, such situation is notified to the status display window 103 (step S252). The notification serves as a preliminary announcement of a communication speed change to the low speed.

On the other hand, in the host PC 101, the status display window 103 waits for the notification of the change to the power saving mode from the printing standby mode from the printer 102 (step S203). When receiving the notification concerned, the status display window 103 changes the timer value to set time T1 from the time T0 (step S204). Here, the set time T1 is fixed time that is enough longer than time required to restart the connection after shutting down the connection once due to the communication speed change, and the relation satisfies T0<T1. The timer immediately starts clocking the set time T1.

Next, the status display window 103 stops the periodical check and transmits the notification of a communication speed change permission to the printer 102 in step S205. Since the periodical check is usually restarted after that as mentioned later, this stop is a temporary interruption substantially.

On the other hand, the CPU 301 of the printer 102 waits for the notification of the communication speed change permission from the status display window 103 (step S253). Then, when receiving the change permission concerned, the CPU 301 starts a process for changing the communication speed of the wire LAN 104 to the low speed (step S254). The communication speed is changed by changing the communication speed setting of the PHY chip 310. Then, the communication speed change causes linkdown (step S255). That is, the communication connection between the host PC 101 and the printer 102 through the wire LAN 104 is shut down.

In the printer 102, the communication connecting condition of the wire LAN 104 in the low speed will be recovered before long (usually within several seconds), and will become a reconnection state (linkup). After the linkup, the CPU 301 notifies the status display window 103 that the communication has been reconnected (step S256). Then, the printer 102 enters a condition for waiting for a change to the printing standby mode (step S257), and the CPU 301 proceeds with the process to steps in FIG. 5A and FIG. 5B.

On the other hand, the status display window 103 of the host PC 101 waits for the notification of reconnection from the printer 102 in step S206, When receiving the notification of reconnection before the set time T1 set as the timer value elapses, the status display window 103 resets the timer value to the time T0 as the default value from the set time T1 (step S207). Then, the periodical check is restarted (step S208).

Then, the status display window 103 displays the mode sign showing that the printer 102 is in the power saving mode (step S209). For example, a message like "sleeping" is displayed on the display unit 207 (see FIG. 6B). Then, the status display window 103 waits for a change to the printing standby mode (step S210), and proceeds with the process to steps in FIG. 5A and FIG. 5B.

On the other hand, when the notification of reconnection is not received from the printer 102 before the set time T1 elapses in the step S206, the status display window 103 determines that a communication error occurs, and displays a message of "communication error" on the display unit 207 (step S211, see FIG. 6C). Then, the status display window 103 waits for a change to the printing standby mode (the step S210).

Next, operations in the case of returning to the printing standby mode from the power saving mode will be described with reference to FIG. 5A and FIG. 5B. A process content of each step in FIG. 5A and FIG. 5B is equivalent to each step in FIG. 4A and FIG. 4B where the relation between the power saving mode and the printing standby mode is reversed, and is fundamentally similar.

First, in the host PC101, the status display window 103 starts the periodical check (step S301), and sets the timer value to the time T0 as the default value (step S302).

When the printer 102 responds to the query of the periodical check by returning a "communication OK", which shows the connecting condition is normal, within the time T0, the status display window 103 determines that the connecting condition is normal, and displays a message of "sleeping" showing that the printer 102 is in the power saving mode on the display unit 207 (see FIG. 6B). On the other hand, when there is no response of "communication OK", the status display window 103 determines that a communication error occurred, and displays a message of "communication error" on the display unit 207 (see FIG. 6C).

On the other hand, the CPU 301 of the printer 102 determines whether a return to the printing standby mode from the power saving mode is detected (step S351). When the return to the printing standby mode is detected, such situation is notified to the status display window 103 (step S352). The notification serves as a preliminary announcement of a communication speed change to the high speed.

On the other hand, in the host PC 101, the status display window 103 waits for the notification of the return to the printing standby mode from the power saving mode from the printer 102 (step S303). When receiving the notification concerned, the status display window 103 changes the timer value to set time T1 from the time T0 (step S304). Next, the status display window 103 stops the routine check and transmits the notification of a communication speed change permission to the printer 102 (step S305).

On the other hand, the CPU 301 of the printer 102 waits for the notification of the communication speed change permission from the status display window 103 (step S353). Then, when receiving the change permission concerned, the CPU 301 starts a process for changing the communication speed of the wire LAN 104 to the high speed (step S254). The communication speed is changed by changing the communication speed setting of the PHY chip 310. Then, the communication speed change causes linkdown (step S355). That is, the communication connection between the host PC 101 and the printer 102 through the wire LAN 104 is shut down.

In the printer 102, the communication connecting condition of the wire LAN 104 in the high speed will be recovered before long (usually within several seconds), and will become a reconnection state (linkup). After the linkup, the CPU 301 notifies the status display window 103 that the communication has been reconnected (step S356).

Then, the printer 102 enters a condition for waiting for a change to the power saving mode (step S357), and the CPU 301 proceeds with the process to steps in FIG. 4A and FIG. 4B.

On the other hand, the status display window 103 of the host PC 101 waits for the notification of reconnection from the printer 102 in step S306, When receiving the notification of reconnection before the set time T1 set as the timer value elapses, the status display window 103 resets the timer value to the time T0 as the default value from the set time T1 (step S307). Then, the periodical check is restarted (step S308).

Then, the status display window 103 displays the mode sign showing that the printer 102 is in the printing standby mode (step S309). For example, the message of "ready to print" is displayed on the display unit 207 (see FIG. 6A). Then, the status display window 103 waits for a change to the printing standby mode (step S310), and proceeds with the process to steps in FIG. 4A and FIG. 4B.

On the other hand, when the notification of reconnection is not received from the printer 102 before the set time T1 elapses in the step S306, the status display window 103 determines that a communication error occurs, and displays a message of "communication error" on the display unit 207 (step S311, see FIG. 6C). Then, the status display window 103 waits for a change to the power saving mode (the step S310).

According to this embodiment, the periodical check by the status display window 103 is stopped during the set time T1 unless the communication is reconnected, when the communication is shut down temporarily due to the communication speed change in the printer 102. Since the periodical check stops just before the communication speed change in the printer 102, the periodical check does not detect a communication error before the reconnection. This prevents determination of the communication error due to communication shutdown accompanying the communication speed change so as not to inspire a user with unnecessary uneasiness. Since the temporary disconnection of the wire LAN 104 is not displayed to a user as a communication error, the queries to the call center from users can be reduced, and cost reduction can be attained.

Since the CPU 301 of the printer 102 changes the communication speed on condition that the change permission is notified from the status display window 103, the periodical check in the host PC 101 can be certainly stopped before the communication speed change. And the status display window 103 stops the periodical check immediately after receiving the notification of the change to the power saving mode or the return from the power saving mode. Therefore, the periodical check can be stopped at the timing just before the communication speed change in the printer 102.

Since the stopped periodical check is restarted when the communication is reconnected within the set time T1, the communication can be immediately returned to the regular condition in which the periodical check is executed after the connecting condition becomes normal.

Incidentally, the set time T1 that is set as the timer value in the step S204 in FIG. 4A may be different from the set time T1 that is set in the step S304 in FIG. 5A.

The above-mentioned embodiment uses the same timer in the steps S202, S204, and S207 in FIG. 4A and FIG. 4B, and changes the timer value between the default time T0 and the set time T1. However, the present invention is not limited to this configuration. For example, a timer to which the allowed time (time T0) of the response from the printer 102 in the periodical check is set, and a timer to which the allowed time (set time T1) to restart the connection after disconnecting the communication once in the printer 102 is set may be established separately. This is similarly applied to the steps S302, S304, and S307 in FIG. 5A and FIG. 5B.

Incidentally, the preliminary announcement of the communication speed change to the low speed or the high speed in the step S252 in FIG. 4A or the step S352 in FIG. 5A is the notification of the change to the power saving mode or the return from the power saving mode. However, the preliminary announcement is not limited to this and what is necessary is just to notify that the communication speed will change to the host PC 101 in a certain situation.

In this embodiment, the periodical check is stopped before the communication speed change in the printer 102 when the mode of the printer changes to the power saving mode or returns from the power saving mode as triggers. However, the trigger for stopping the periodical check is not limited to these. A matter that changes the communication speed may be a trigger.

In this embodiment, when there is no response of "communication OK" to the query of the periodical check, the message of "communication error" is displayed on the display unit 207 (the steps S201 and S301). Also when the notification of reconnection is not received from the printer 102 before the set time T1 elapses, the message of "communication error" is displayed on the display unit 207 (the step S211 and S311). However, the method for notifying the communication error is not limited to these method and what is necessary is just to notify a user in a certain method. For example, the communication error may be notified a user with a voice.

Although when the notification of reconnection is not received from the printer 102 before the set time T1 elapses in the step S206 in FIG. 4B and the step S306 in FIG. 5B, it is determined that the communication error occurs and the periodical check is not restarted, such a process is not necessarily required. For example, even when the notification is not received, the periodical check may be restarted after elapsing of the set time T1. In such a case, the first periodical check after restarting usually shall determine that the communication error occurs.

When focusing to the prevention of the determination of the communication error due to the communication shutdown accompanying the communication speed change, the establishment of the period (set time T1) for waiting for the notification of reconnection is not indispensable. That is, the periodical check may be stopped until receiving the notification of reconnection.

Although this embodiment shows the printer 102 as the terminal, the host PC 101 as the communication monitoring apparatus, and the wire LAN 104 as the network, the present invention is not limited to these. For example, another apparatus that can change the communication speed may be used as the terminal. Another apparatus that can monitor the connecting condition of the communication with the terminal via the network may be used as the communication monitoring apparatus. Another network that shuts down the communication once due to the communication speed change may be used as the network. For example, wireless LAN etc. are sufficient.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-160630, filed on Jul. 15, 2010, which is hereby incorporated by reference herein in its entirety.

What is claimed is:

1. An information processing apparatus capable of communicating with a terminal apparatus, comprising:
   a checking unit configured to check a communication status between the information processing apparatus and the terminal apparatus;
   a providing unit configured to provide an error indication to a user of the information processing apparatus when a result of the check by the checking unit indicates that the communication status is abnormal; and
   a control unit configured to cause the error indication not to be provided while a communication speed is being changed at the terminal apparatus.

2. The information processing apparatus according to claim 1, further comprising,
   a first receiving unit configured to receive a first notification from the terminal apparatus;
   wherein the control unit detects that the communication speed is to be changed at the terminal apparatus, based on the received first notification.

3. The information processing apparatus according to claim 2, further comprising,
   a response unit configured to respond, to the first notification, that changing of the communication speed at the terminal apparatus is allowed.

4. The information processing apparatus according to claim 1, wherein
   the checking unit checks the communication status periodically, and
   the control unit causes the checking unit to stop checking the communication status while the communication speed is being changed at the terminal apparatus.

5. The information processing apparatus according to claim 1, further comprising,
   a second receiving unit configured to receive a second notification from the terminal apparatus;
   wherein the control unit detects that changing of the communication speed at the terminal apparatus has been completed, based on the received second notification.

6. The information processing apparatus according to claim 5, wherein
   the control unit causes the providing unit to provide the error indication when a predetermined period has elapsed without receiving the second notification.

7. An information processing system including an information processing apparatus and a terminal apparatus,
   the terminal apparatus comprising:
   a first network interface configured to connect to a network; and
   a changing unit configured to change a communication speed of a communication via the network; and
   the terminal apparatus comprising:
   a second network interface configured to connect to the network;
   a checking unit configured to check a communication status between the information processing apparatus and the terminal apparatus;
   a providing unit configured to provide an error indication to a user of the information processing apparatus when a result of the check by the checking unit indicates that the communication status is abnormal; and
   a control unit configured to cause the error indication not to be provided while the communication speed is being changed at the terminal apparatus.

8. The information processing system according to claim 7, wherein
   the checking unit checks the communication status periodically, and
   the control unit causes the checking unit to stop checking the communication status while the communication speed is being changed at the terminal apparatus.

9. The information processing system according to claim 7, wherein
   the changing unit changes the communication speed when the terminal apparatus is changed to a power saving mode or when the terminal apparatus returns from the power saving mode.

10. The information processing system according to claim 7, wherein
    the terminal apparatus is a printer.

11. A control method for controlling an information processing apparatus capable of communicating with a terminal apparatus, the method comprising:
    a checking step of checking a communication status between the information processing apparatus and the terminal apparatus;
    a providing step of providing an error indication to a user of the information processing apparatus when a result of the check in the checking step indicates that the communication status is abnormal; and
    a control step of causing the error indication not to be provided while a communication speed is being changed at the terminal apparatus.

12. A communication status checking method for an information processing system including an information processing apparatus having a first network interface configured to connect to a network and a terminal apparatus having a second network interface configured to connect to the network, the method comprising:
    in the terminal apparatus,
    a changing step of changing a communication speed of a communication via the network; and
    in the terminal apparatus,
    a checking step of checking a communication status between the information processing apparatus and the terminal apparatus;
    a providing step of providing an error indication to a user of the information processing apparatus when a result of the check in the checking step indicates that the communication status is abnormal; and
    a control step of causing the error indication not to be provided while a communication speed is being changed at the terminal apparatus.

13. A non-transitory computer-readable storage medium storing a program that, when executed by a computer, causes the computer to perform a control method for controlling an information processing apparatus capable of communicating with a terminal apparatus, the method comprising:
    a checking step of checking a communication status between the information processing apparatus and the terminal apparatus;
    a providing step of providing an error indication to a user of the information processing apparatus when a result of the check in the checking step indicates that the communication status is abnormal; and
    a control step of causing the error indication not to be provided while a communication speed is being changed at the terminal apparatus.

14. A non-transitory computer-readable storage medium storing a program that, when executed by a computer, causes the computer to perform a communication status checking method for an information processing system including an information processing apparatus having a first network interface configured to connect to a network and a terminal apparatus having a second network interface configured to connect to the network, the method comprising:
  in the terminal apparatus,
    a changing step of changing a communication speed of a communication via the network; and
  in the terminal apparatus,
    a checking step of checking a communication status between the information processing apparatus and the terminal apparatus;
  a providing step of providing an error indication to a user of the information processing apparatus when a result of the check in the checking step indicates that the communication status is abnormal; and
  a control step of causing the error indication not to be provided while a communication speed is being changed at the terminal apparatus.

* * * * *